US009053600B2

(12) United States Patent
Day et al.

(10) Patent No.: US 9,053,600 B2
(45) Date of Patent: Jun. 9, 2015

(54) DIGITAL MEDIA KIOSK

(75) Inventors: Phil Day, Fife (GB); Andrew Colley, Dundee (GB); Jim Henderson, Fife (GB)

(73) Assignee: NCR Corporation, Duluth, GA (US)

( * ) Notice: Subject to any disclaimer, the term of this patent is extended or adjusted under 35 U.S.C. 154(b) by 216 days.

(21) Appl. No.: 12/974,429

(22) Filed: Dec. 21, 2010

(65) Prior Publication Data

US 2012/0158171 A1 Jun. 21, 2012

(51) Int. Cl.
*G06F 17/00* (2006.01)
*G07F 17/16* (2006.01)
*G06Q 30/06* (2012.01)
*G06Q 20/12* (2012.01)

(52) U.S. Cl.
CPC ............... *G07F 17/16* (2013.01); *G06Q 30/06* (2013.01); *G06Q 20/1235* (2013.01)

(58) Field of Classification Search
CPC ............................ G07F 17/16; G06Q 20/1235
USPC .................... 700/233, 234, 242, 243
See application file for complete search history.

(56) References Cited

U.S. PATENT DOCUMENTS

| 6,678,579 | B2 * | 1/2004 | Butikofer ...................... 700/235 |
| 6,748,539 | B1 * | 6/2004 | Lotspiech ........................ 726/20 |
| 6,772,047 | B2 * | 8/2004 | Butikofer ...................... 700/235 |
| 6,786,355 | B2 | 9/2004 | Chirnomas |
| 6,840,399 | B2 | 1/2005 | Chirnomas |
| 6,845,398 | B1 * | 1/2005 | Galensky et al. ............. 709/231 |
| 6,868,983 | B2 | 3/2005 | Chirnomas |
| 6,942,122 | B2 | 9/2005 | Chirnomas |
| 6,993,509 | B2 * | 1/2006 | Vidich et al. .................... 705/51 |
| 7,044,330 | B2 | 5/2006 | Chirnomas |
| 7,383,099 | B2 * | 6/2008 | Pollard et al. ................. 700/232 |
| 7,475,042 | B2 * | 1/2009 | Carvalho ........................ 705/59 |
| 7,873,746 | B2 * | 1/2011 | Li ................................. 709/246 |
| 8,027,471 | B2 * | 9/2011 | Widergren ..................... 380/239 |
| 8,028,173 | B2 * | 9/2011 | Widergren et al. ........... 713/193 |
| 8,255,080 | B2 * | 8/2012 | Hirsh et al. .................... 700/242 |
| 8,321,052 | B2 * | 11/2012 | Yepez et al. .................. 700/237 |
| 8,610,574 | B2 * | 12/2013 | Kestenbaum .............. 340/572.1 |
| 8,717,316 | B2 * | 5/2014 | Gothard ........................ 345/173 |
| 8,818,902 | B2 * | 8/2014 | Schiesser et al. ............... 705/59 |
| 2002/0161476 | A1 * | 10/2002 | Panofsky et al. ............. 700/231 |
| 2003/0040838 | A1 * | 2/2003 | Lagunzad et al. ............ 700/232 |
| 2005/0228821 | A1 * | 10/2005 | Gold .............................. 707/102 |
| 2007/0169132 | A1 | 7/2007 | Blust et al. |
| 2007/0271143 | A1 * | 11/2007 | Dooley et al. .................... 705/14 |
| 2008/0288106 | A1 * | 11/2008 | Widergren et al. ........... 700/234 |
| 2009/0037605 | A1 * | 2/2009 | Li ................................. 709/246 |
| 2009/0070820 | A1 * | 3/2009 | Li ................................... 725/62 |
| 2010/0138037 | A1 * | 6/2010 | Adelberg et al. ............. 700/241 |
| 2010/0211217 | A1 * | 8/2010 | Hirsh et al. .................... 700/234 |

(Continued)

*Primary Examiner* — Michael K Collins
(74) *Attorney, Agent, or Firm* — Peter H. Priest; Joseph P. Mehrle (57) ABSTRACT

A kiosk for sale or rental of secure USB flash drives employing digital rights management to implement secure digital media storage such as that provided by encrypted storage utilizing content protection for recordable media (CPRM) or the like. Preferably, the form factor of the secure USB flash drives is that of a standard USB flash drive, and a standard USB connector is employed therein making the devices and their use familiar and comfortable to the average consumer. Further, the kiosk may employ an array of USB ports and support writing of content from one drive to another to advantageously adjust inventory to respond to demand. Light, simple kiosks may be designed.

10 Claims, 9 Drawing Sheets

(56) References Cited

U.S. PATENT DOCUMENTS

| | | | |
|---|---|---|---|
| 2011/0013501 A1* | 1/2011 | Curtis | 369/100 |
| 2011/0130873 A1* | 6/2011 | Yepez et al. | 700/237 |
| 2011/0153067 A1* | 6/2011 | Weinshenker | 700/232 |
| 2011/0234514 A1* | 9/2011 | Gothard | 345/173 |
| 2012/0011221 A1* | 1/2012 | Widergren et al. | 709/217 |
| 2012/0130533 A1* | 5/2012 | Schiesser et al. | 700/234 |
| 2012/0159518 A1* | 6/2012 | Boliek et al. | 719/318 |
| 2013/0123978 A1* | 5/2013 | Stark et al. | 700/242 |

* cited by examiner

DIGITAL MEDIA KIOSK

RELATED APPLICATION

The subject matter of the present application is related to that of our U.S. application Ser. No. 12/974,515 filed Dec. 21, 2010, assigned to the assignee of the present application, entitled Secure Digital Download Storage Device, and incorporated by reference herein in its entirety.

FIELD OF THE INVENTION

The present invention is related generally to improved digital media kiosks, and more particularly to such kiosks which advantageously dispense a USB flash drive as discussed further below.

BACKGROUND OF THE INVENTION

Solid state storage cards such as SD, XD and compact flash cards, hereafter collectively referred to as flash cards for brevity, are a convenient media for storing large amounts of data in a small form factor. However, inserting and removing such cards can be tricky, and it is possible to insert them in an incorrect orientation. In addition, although they are widely used in products such as cameras and mobile phones, they are usually used to expand the memory of such a device. A common usage is to insert the flash card into the device, and then leave it inside the device and access the card via the device often by means of a USB lead plugged into a USB port of the device, such as a camera, on one end and into a second device, such as a laptop or television, on the other.

SUMMARY OF THE INVENTION

The above identified related application describes a new device that is packaged like a standard USB flash drive, but which can be addressed as if it were a secure digital (SD) card. The present application addresses how such a secure USB flash drive can be advantageously used in a kiosk offering digital media, such as movies, music, books or games.

Among its several aspects, a kiosk according to the present invention can store movies, music, books and computer games on a single familiar device which can be recycled at the kiosk. Kiosks utilizing such devices may advantageously have the flexibility to readily adjust inventory by copying from titles already in stock. Inventory can thus be adjusted for holidays, to account for better than expected demand for new releases, to refresh stock, and the like. Writing can be done offline. Promotions, trailers, local advertising, cross-selling, and other campaigns can be advantageously implemented with offline writing during night hours and the like. Multiple formats (Std Def, Hi Def) May be included on the same device. A potential for additional revenue by means of advertising, cross-selling and the like is presented. Advertising, games, audio books, links to web-based services, time based media such as newspaper headlines may be readily included. In some embodiments, a customer does not need to use a credit card, and can simply use a debit card as systems can be employed not requiring anything to be returned. Age verification can be implemented by requiring a consumer to suitably establish age using a client media player, or an interface with a set top box and employing a PIN number. The invention may further be employed to offer the ability to pre-order and preapprove via other channels such as the web or a mobile, with fulfilment supported through a kiosk.

One aspect of the invention addresses a kiosk employing a secure universal serial bus (USB) flash drive comprising: a selection mechanism for selecting a title of digital media stored on a secure USB flash drive; a payment mechanism for making payment for the selected title; storage for storing secure USB flash drives storing prerecorded digital media; and a retrieval mechanism adapted for retrieving the selected title and dispensing the selected title.

A more complete understanding of the present invention, as well as further features and advantages of the invention, will be apparent from the following Detailed Description and the accompanying drawings.

DETAILED DESCRIPTION

Figure 1:
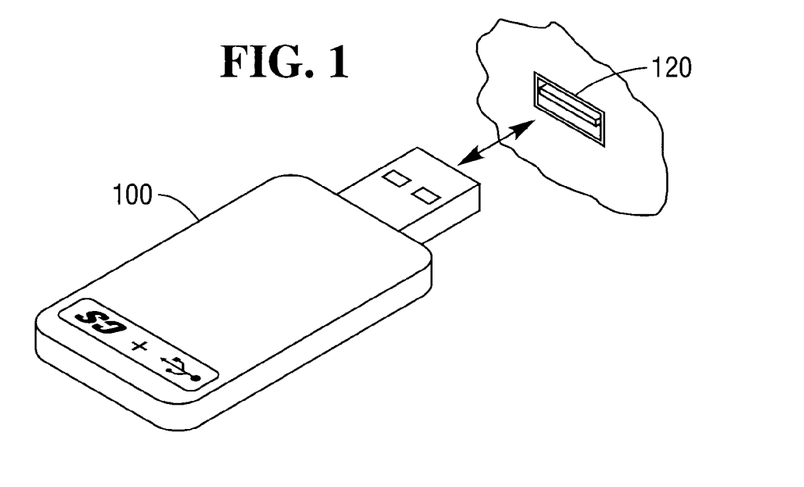
FIG. 1 illustrates a secure USB flash drive and its utilization with a standard USB port in accordance with a presently preferred embodiment of the invention.

According to one aspect of the present invention, a secure USB flash drive is used in conjunction with a kiosk as further herein described. FIG. 1 shows a secure USB flash drive for utilization in conjunction with a standard USB port 120. Further details are found in our U.S. application Ser. No. 12/974,515 filed Dec. 21, 2010 entitled "Secure Digital Download Storage Device" and are incorporated by reference herein.

The use of a secure USB flash drive for storing digital multimedia content such as movies, music, books and games has a wide variety of potential advantages. This format has the usability and familiarity advantages of using standard USB ports rather than SD and microSD connectors and adapters while keeping the digital rights management (DRM) and security advantages of SD. This approach eliminates the need for CPRM capable SD card slots on target devices with which it is desired to employ the media. Further, a kiosk can copy content in periods of low or non-usage, such as at night. Media such as movies, games and the like can be copied offline. The approach supports the ability to offer multiple formats, for example, standard definition or high definition movies can be offered in a cost-efficient manner. Consumer throughput at kiosk may be improved as download or write times are less relevant. Returned drives can be wiped, validated, and then reprogrammed, thus preventing security issues.

Figure 2A:
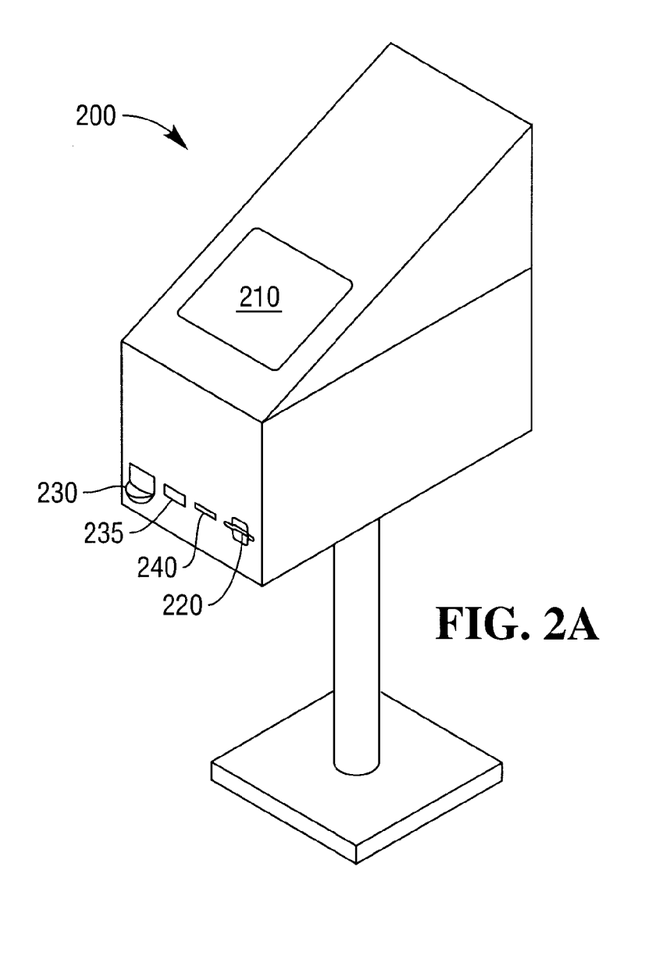
FIGS. 2A and 2B illustrate aspects of a kiosk for rental or purchase of prerecorded digital media in accordance with the present invention.
Figure 2B:
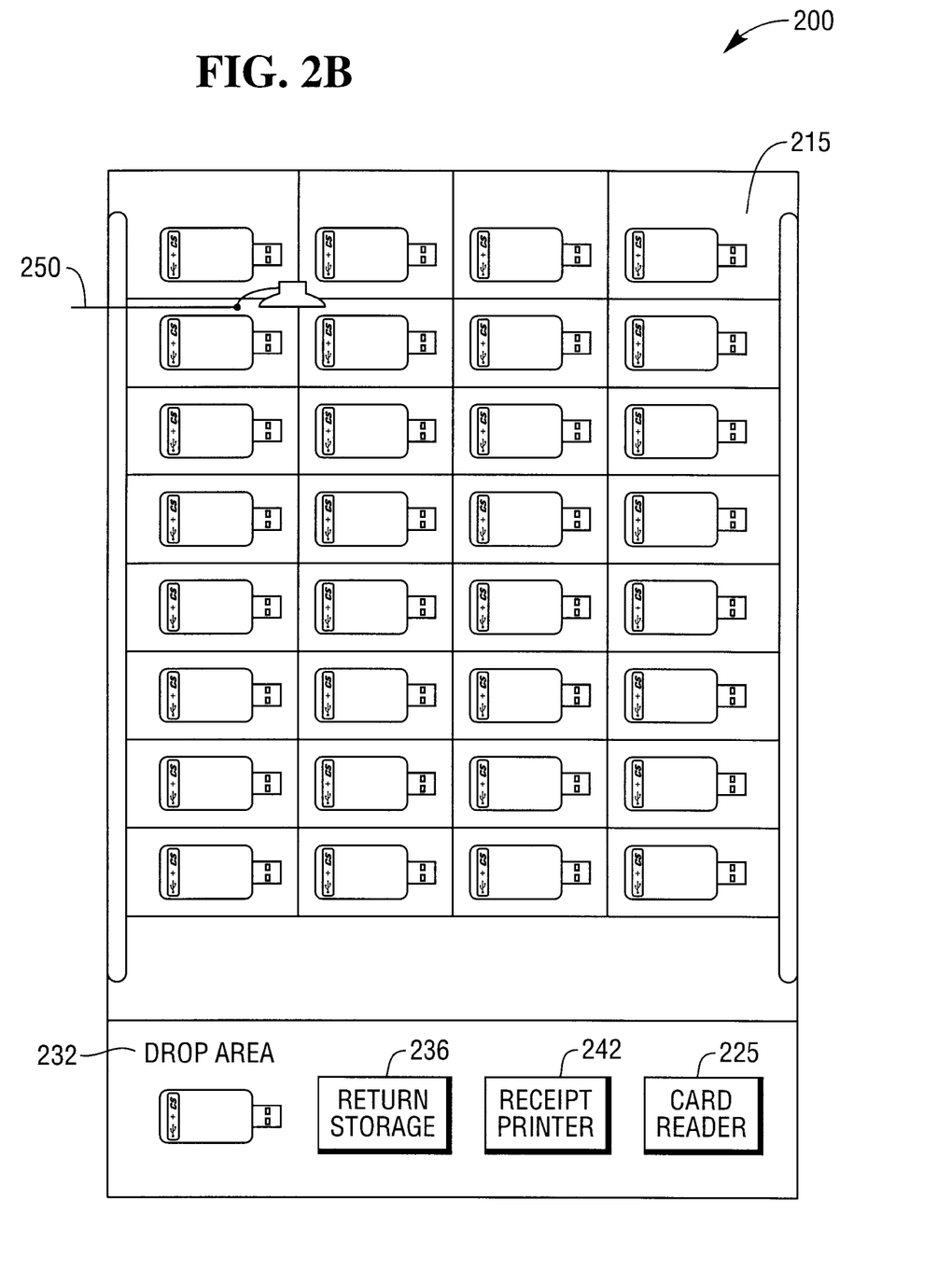

In one aspect of the invention, the secure USB flash drive is populated with the most popular multimedia content before a customer arrives and is dispensed by a kiosk, such as pedestal kiosk 200 of FIGS. 2A and 2B. In FIGS. 2A and 2B, the content is prerecorded, but it will be recognized that as discussed further below in connection with FIGS. 4A and 4B, that content can also advantageously be written to secure flash drives at the kiosk.

Pedestal kiosk 200 may suitably operate as follows. A customer approaches kiosk 200, selects a movie, music, videogame, or other desired digital content using touch panel screens 210. The customer pays for a transaction by inserting a magnetic stripe card such as a credit card, a debit card, a prepaid gift card or the like into a card reader slot 220. Alternatively, other payment mechanisms may be employed, such as smart cards, contactless cards, or the like. A card reader 225 (shown in FIG. 2B) reads the card and a control processor authorizes the transaction. A picker or transport mechanism 250 described in connection with FIG. 2B below retrieves the selected digital content stored on a secure USB flash drive and delivers it to a drop area 232 (FIG. 2B) where it is released and then falls under the influence of gravity to the customer at dispense port 230. If the transaction is a rental, the returned content may be suitably returned to return slot 235 where it passes to return storage 236 (FIG. 2B). A receipt printer 242 (FIG. 2B) prints a receipt delivered through receipt slot 240.

Turning to FIG. 2B, the dispense mechanism may make use of existing XY transports in current DVD vending kiosks, or may use some alternative retrieval mechanism. In general, it will be recognized the teachings of the present invention may be readily adapted to the operation of a wide array of existing DVD kiosks, as well as, digital download kiosks. For example, kiosk 200 or other kiosks described herein may suitably employ any of the details shown in FIGS. 28-35 and described by paragraphs [0130]-[0140] of U.S. Patent Application Publication No. 2007/0169132 published Jul. 19, 2007 which is incorporated herein in its entirety. Such operation is advantageously modified as discussed further below to take advantage of the secure USB flash drive format.

As illustrated in FIG. 2B, the physical footprint of the secure USB flash drive is well suited to stacking of the drives in bins 215 in which secure USB flash drives with different prerecorded digital content are simply stacked one on top of another. With such an approach, the use of existing vacuum picking technology to pick up and transport the selected secure USB flash drive to drop area 232 and the port 230 (FIG. 2A) is a highly suitable approach to transport. In such an approach, a vacuum picker mechanism 250 travels in x- and y-directions above the bins 215 to select the appropriate secure USB flash drive to be dispensed. Once above the correct drive, picker 250 is lowered, a predetermined vacuum is applied and the top drive is sucked up. The picker 250 is then raised and moved to a point above the drop area 232 where the vacuum is released and the drive is dropped. The sturdy design of the secure USB flash drive is well suited to a simple gravity drop arrangement as described herein. Further details of vacuum pickers suitably for use herein are described in U.S. Pat. Nos. 6,786,355; 6,840,399; 6,868,983; 6,942,122; 7,044,330, for example, all of which are incorporated by reference herein in their entirety. The small size and durable design of the secure USB flash drive employed herein advantageously lends itself to reduced size, lost cost kiosks.

Figure 3A:
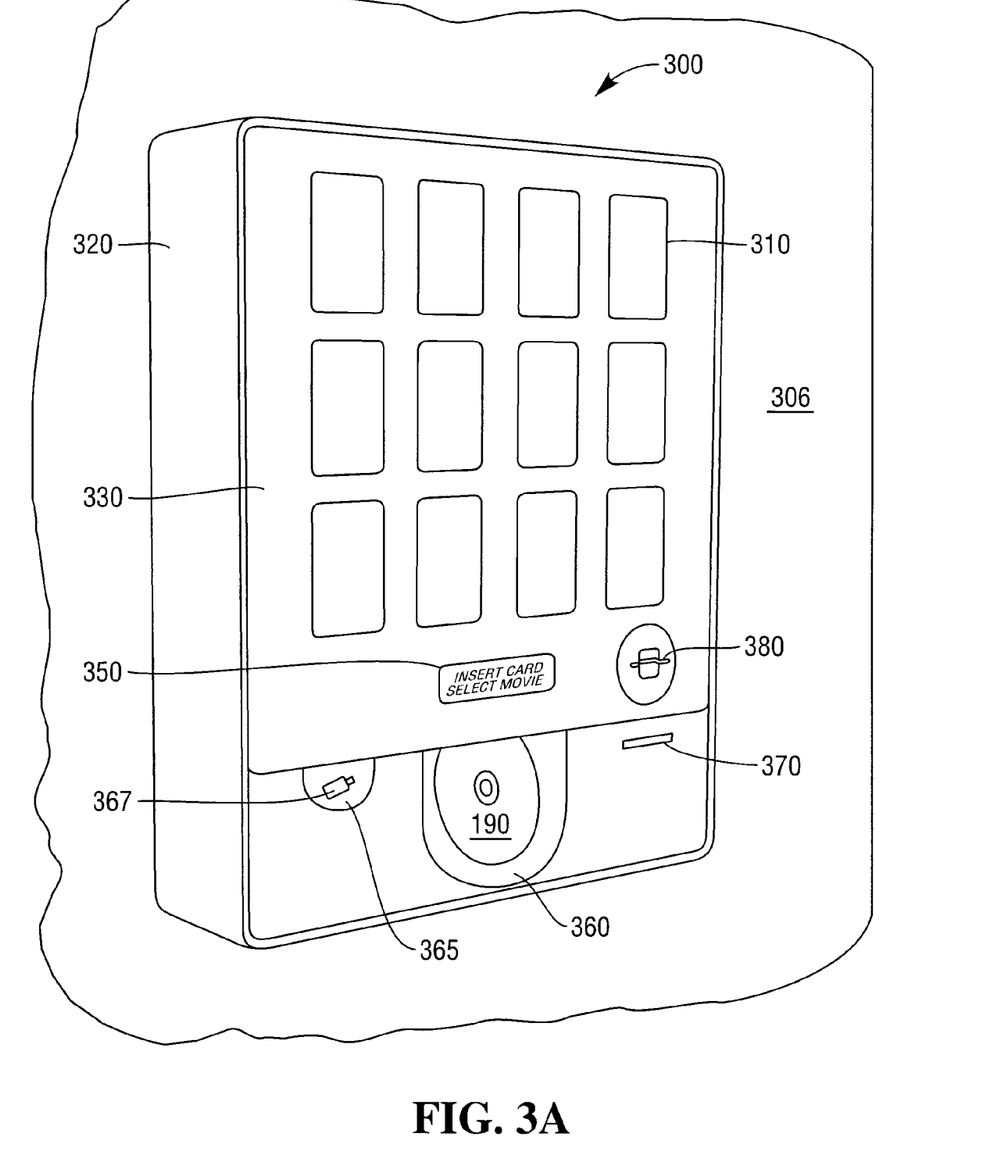
FIGS. 3A, 3B and 3C illustrate aspects of a hybrid kiosk for delivery of digital media prerecorded on DVDs, as well as, digital media and prerecorded on secure USB flash drives in accordance with the present invention.
Figure 3B:
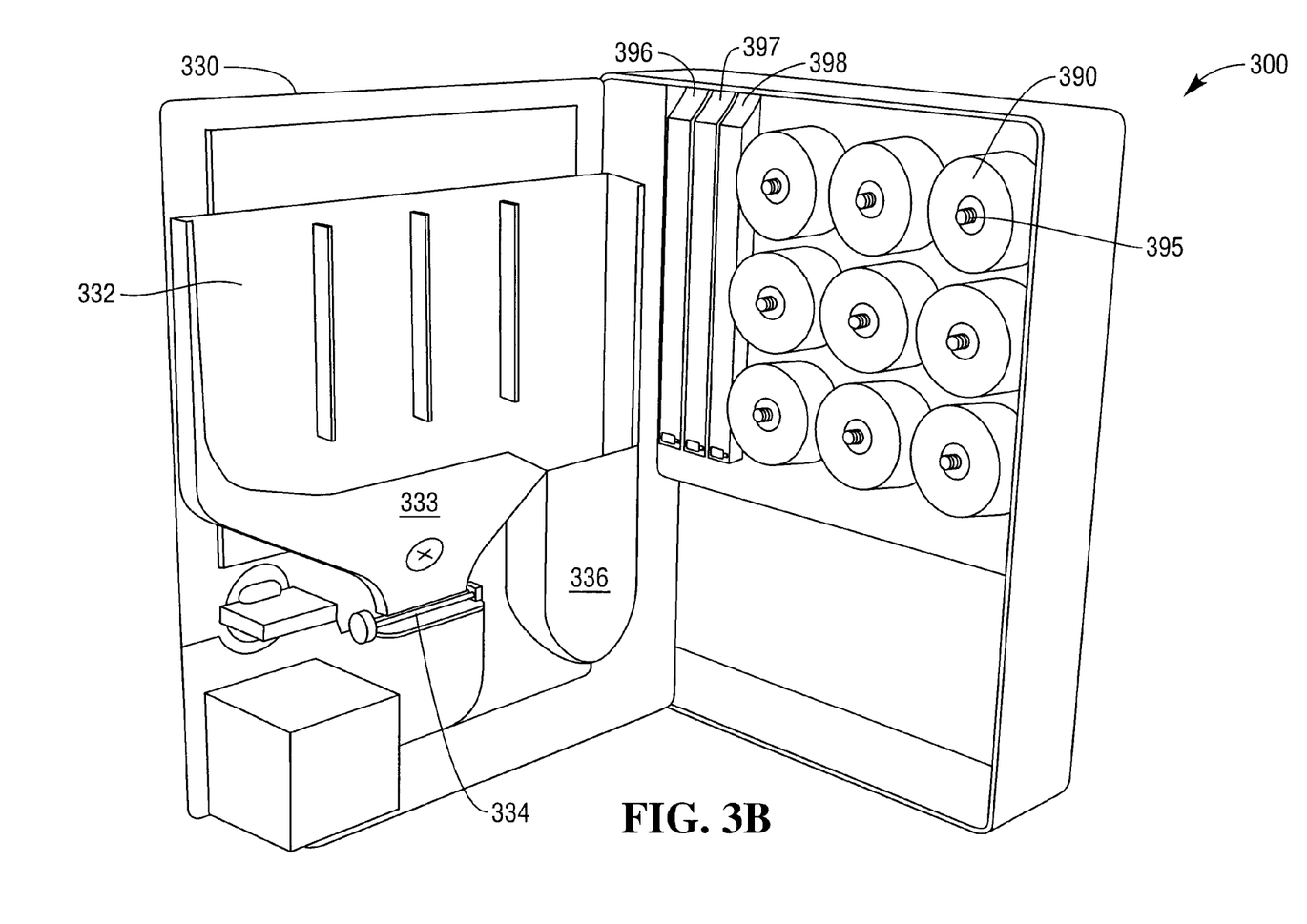
Figure 3C:
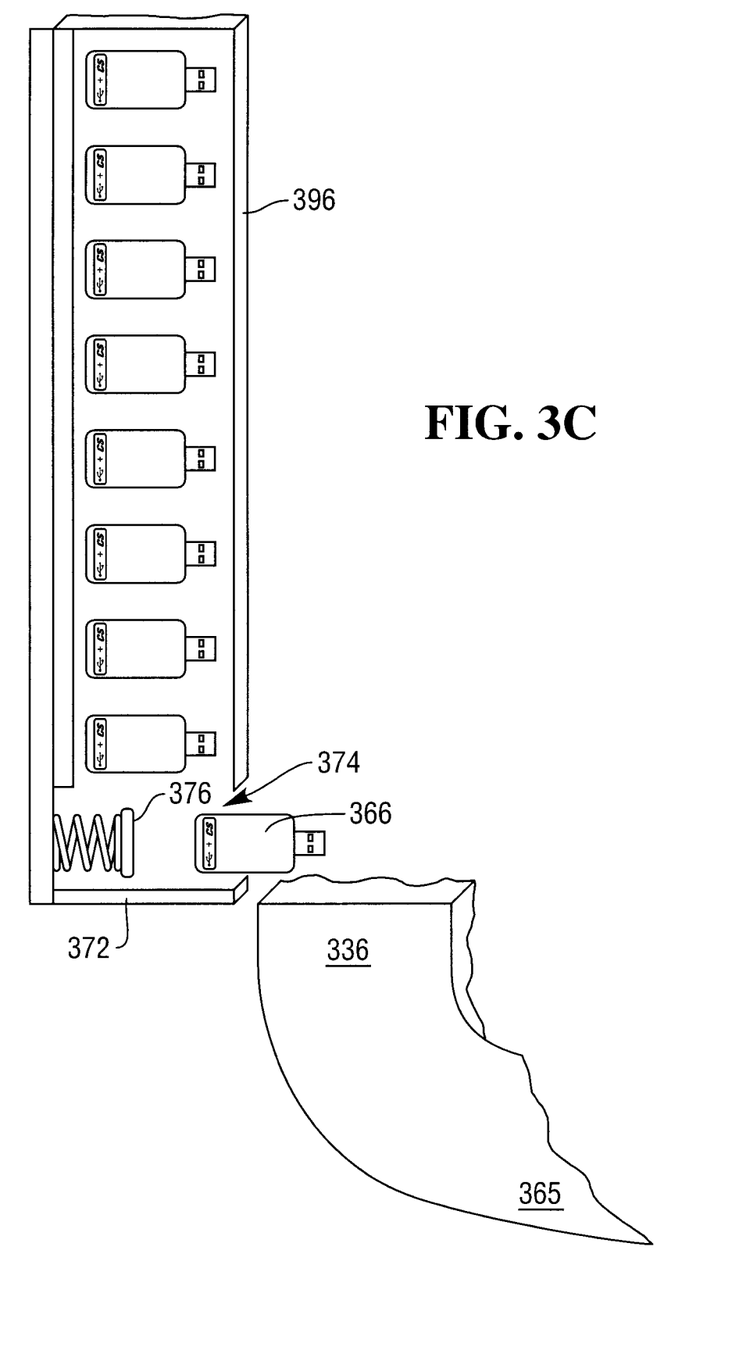

Unlike FIGS. 2A and 2B which show a kiosk, kiosk 200, exclusively for use with prerecorded secure USB flash drives, FIGS. 3A, 3B and 3C illustrate an exemplary kiosk 300 for delivery of digital content utilizing both DVDs and secure USB flash drives.

In FIG. 3A, kiosk 300 is mounted on a wall 306. Kiosk 300 includes plural media title push buttons 310. In the embodiment of FIG. 3A, twelve push buttons or selection switches 310 are shown although it will be recognized a larger or smaller number may be employed for purposes of making a selection of a desired title by a customer or that a touch panel display, like touch panel display 210 of FIG. 2A, or another selection mechanism may be suitably employed. Each switch 310 may be embodied as a large clear plastic actuator having a product literature insert holder for holding an advertisement for the movie corresponding to the switch. Example dimensions for the kiosk 300 are approximately 30 inches high, 23 inches wide and 6 inches deep for a unit capable of dispensing nine different titles of DVDs which have a thickness of approximately 1.2 mm as described further herein and three different titles prerecorded on secure USB flash drives. With a six inch depth, the kiosk 100 can hold 33 copies of each of nine titles for a total of 297 discs, as well as, a large number of secure USB flash drives. With dimensions such as those described herein, kiosk 300 can be mounted low enough on the wall 306 that it is readily accessible to customers in wheel chairs and the like. It is noted that a standard DVD disc weighs about 0.58 oz. so that 300 discs weigh about eleven and a quarter pounds. Similarly, the large number of secure USB flash drives will also be relatively light. With the proper selection of housing material and thickness, as well as other components, a light and highly portable kiosk results.

Kiosk 300 further comprises a sheet metal case 320, a hinged front panel 330, an LCD display 350, a disc output 360, a secure USB flash drive output 365, a receipt dispensing slot 370 for dispensing a customer receipt, and a credit card reader slot 380 for inserting a credit or other payment card to pay for a rental or purchase.

While it is presently preferred to record or rent securely recorded content, it will also be recognized that the familiarity of the standard USB flash drive coupled with its low cost lends itself to the recording of nonsecure material, such as movie trailers, other promotional material and the like. With any of the kiosks described herein, secure content can be readily supplemented with nonsecure content as the form factors of the two different devices can be exactly the same. The potential opportunities are nearly endless, but several examples are provided as illustrative.

In a grocery store environment, the store owner may be introducing a new self-checkout terminal arrangement and want a ready mechanism to provide customers with a tutorial for its use to facilitate its adoption. A short video illustrating techniques for usage may be recorded on a standard USB flash drive along with some free music, some coupons, a ring tone or some other promotion which the customer can access only upon reviewing the video or completing a tutorial.

A retailer, such as Wal-Mart, may have an exclusive distribution agreement with a rock band, and to promote a new album, both the band and the retailer may give out free USB flash drives with a song and a video to fuel interest. The recorded content can also direct customers to an online site for the store or for the band or both.

Where the kiosk is exclusively a movie kiosk, a free USB flash drive might be loaded with free movie trailers available for rental, might have links to an online site for downloading older releases, or might contain trailers provided by the movie studios for coming attractions at the theaters to promote new movies.

Free content could be available to all or utilized as a promotion which is part of a loyalty program, such as those managed by stores, radio stations, movie theaters, and the like. It is possible to mix media, with both DRM protected media and DRM free content on the same flash drive.

FIG. 3B shows kiosk 300 with the hinged front panel 330 open to illustrate further internal details of the kiosk 300. As seen in FIG. 3B, a plastic disc and secure USB drive drop guide mechanism 332 is supported by the interior surface of hinged front panel 330 above disc output 360 (FIG. 3A) and secure USB flash drive output 365 (FIG. 3A). For ease of maintenance and repair, a simple snap on and snap off mounting arrangement may be employed for guide mechanism 332. As described in further detail below, drop guide mechanism 332 guides a disc selected from the discs 390 on threaded shafts 395 and dropped therefrom in response to selection utilizing a respective one of the pushbuttons 310 by a customer, or a secure USB drive 367 is delivered from a stack held in one of the storage columns, 396, 397 or 398 as discussed further below in connection with FIG. 3C.

At the bottom of drop guide mechanism 332, a funnel 333 aligns and feeds the disc into a set of mechanized rollers 334. Rollers 334 slow and trap the dropped disc so it is presented to the customer at the disc output 360 in a similar manner to the rollers in a car CD player. Alternatively, rollers 334 can drop the disc slowly into a drop bin for collection by the customer. Similarly, the secure USB flash drive 367 is guided by a funnel 336 to flash drive output 365 (FIG. 3A). Because of the rugged construction and design of the secure USB flash drive 367, it can fall under the influence of gravity as guided by the funnel 336 without harm facilitating a simple and low cost dispense mechanism.

FIG. 3C illustrates exemplary details of one columnar storage mechanism 396. As illustrated by FIG. 3C, secure USB flash drives are stacked in a column with a bottom secure USB flash 366 supported by a bottom support 372. A pusher 376 which selectively pushes the bottom drive 366 through a slot 374 at the bottom front of storage mechanism 396. The drive 366 then falls under the influence of gravity and is guided by funnel 336 to port 365. Pusher 376 may be suitably driven by a solenoid. After the secure USB flash drive 366 has been pushed out of storage mechanism 396 and pusher 376 is retracted, the next secure USB flash drive drops onto bottom support 372 and is ready to be dispensed.

Figure 4A:
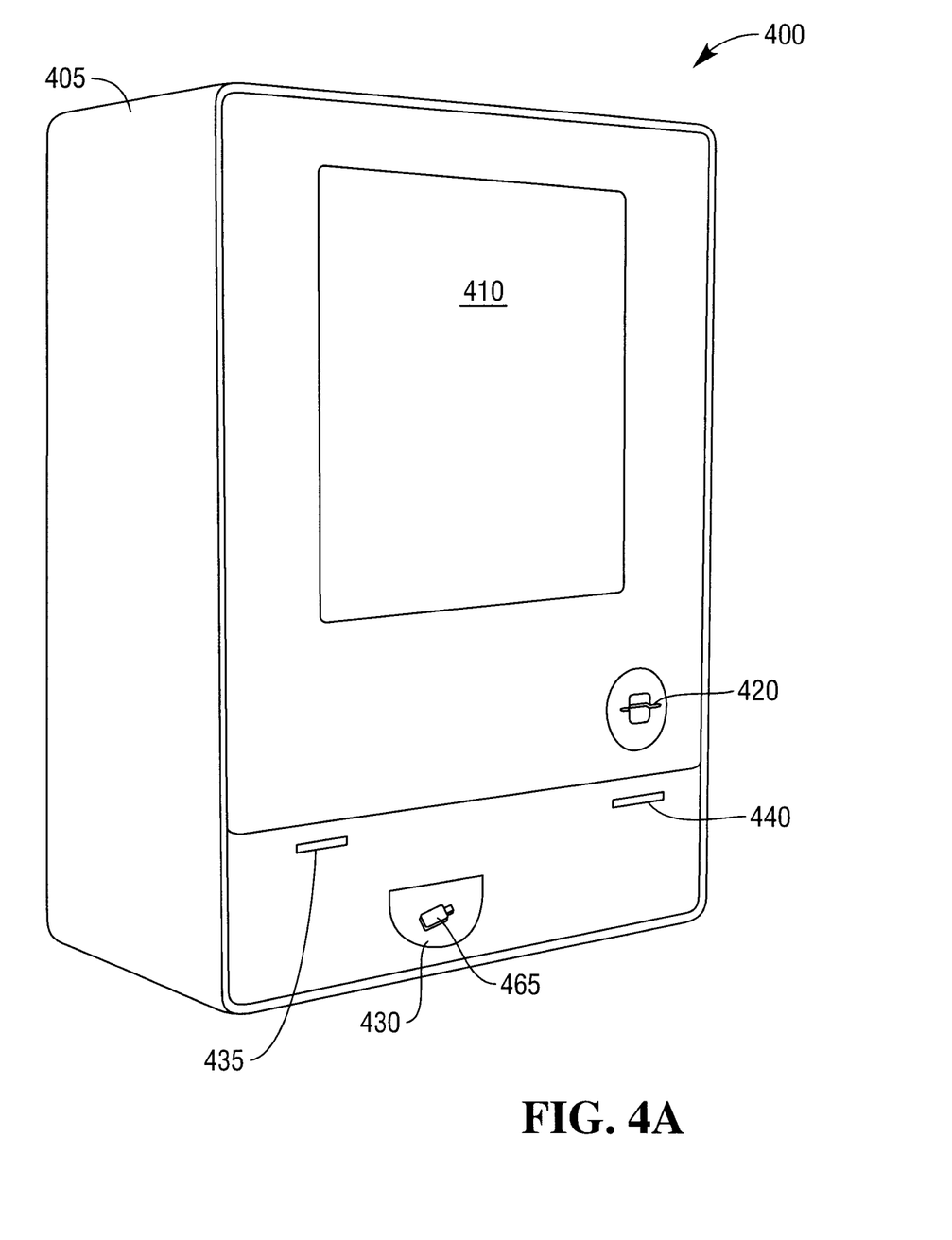
FIGS. 4A and 4B illustrate aspects of a kiosk for reading and writing digital media on secure USB flash drives in accordance with the present invention.
Figure 4B:
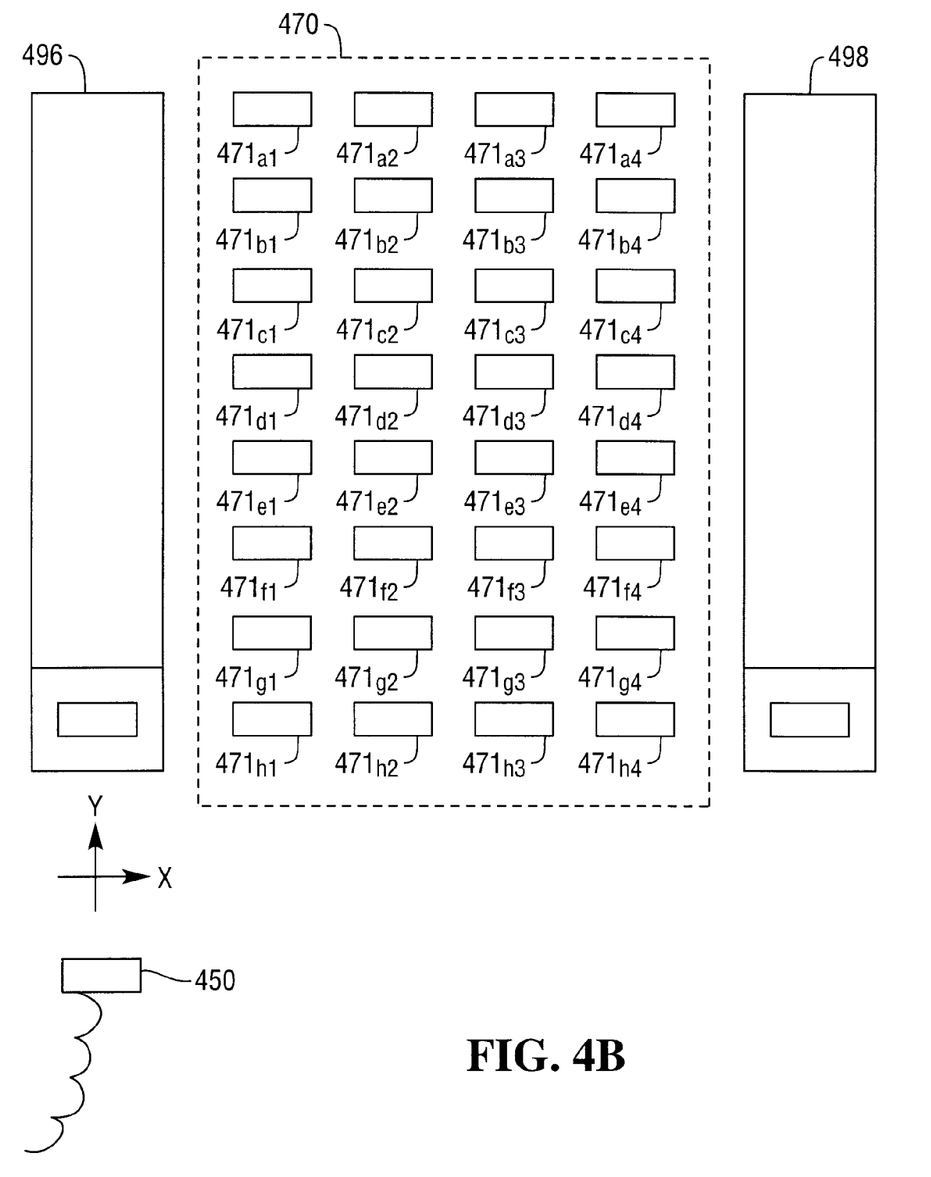

FIGS. 4A and 4B illustrate aspects of a digital media kiosk 400 in accordance with a further embodiment of the present invention in which content from secure USB flash drives can be read and copied within the kiosk 400 as discussed further below.

Thus, secure USB flash drives may suitably store media preprogrammed by the kiosk 400. The ability to use USB drives as additional storage can reduce the storage need of a server in or by a kiosk so long as the kiosk ensures that at least one copy of each title is stored on a secure USB flash drive maintained therein, then any such titles can be readily copied to make additional copies.

As seen in FIG. 4A, the kiosk 400 is suitable for countertop display, can be mounted on a pedestal as in FIG. 2A, wall mounting as in FIG. 3A or piggybacked as shown in FIG. 8 of U.S. application Ser. No. 12/908,213, filed Oct. 20, 2010, the details of which are incorporated by reference herein in their entirety. It will be further noted that such mountings are illustrative and others may be suitably devised. Kiosk 400 has a housing, a touch panel display 410 for selecting content, such as a movie title, music, a computer game, a digital kiosk or the like, recorded on secure USB flash drive 465 delivered at a deliver port 430. A customer pays for a rental or purchase by inserting a payment card into a card reader slot 420 where the card is read by a card reader (not shown). A customer receipt is generated by a receipt printer (not shown) and delivered to the customer through receipt slot 440. For a rental transaction, the secure USB flash drive may be returned through return slot 435.

Turning to FIG. 4B, within the kiosk 400 there is a bank, array or matrix of USB sockets 470, which in use hold a number of secure USB flash drives (not shown). The kiosk 400 can advantageously erase and write content to multiple USB drives in order to reconfigure the inventory held in the kiosk.

FIG. 4B illustrates schematically a matrix 470 of USB port in columns 1-4 and rows a-h with the port in column 1 and row 1 being $471_{a1}$ and the port in column 4 and row h being $471_{h4}$. To the left and right of the matrix 470 are columnar containers 496 and 498, respectively of blank secure USB flash drives.

In operation an articulated robotic picker or vacuum picker 450 can take a blank secure USB flash drive from container 496, and move it to an empty USB port. Content from any recorded secure USB flash drive inserted in any of the other USB ports can be read and written to the blank flash drive. This approach supports an advantageous rebalancing of inventory to adapt to customer demand.

Figure 5:
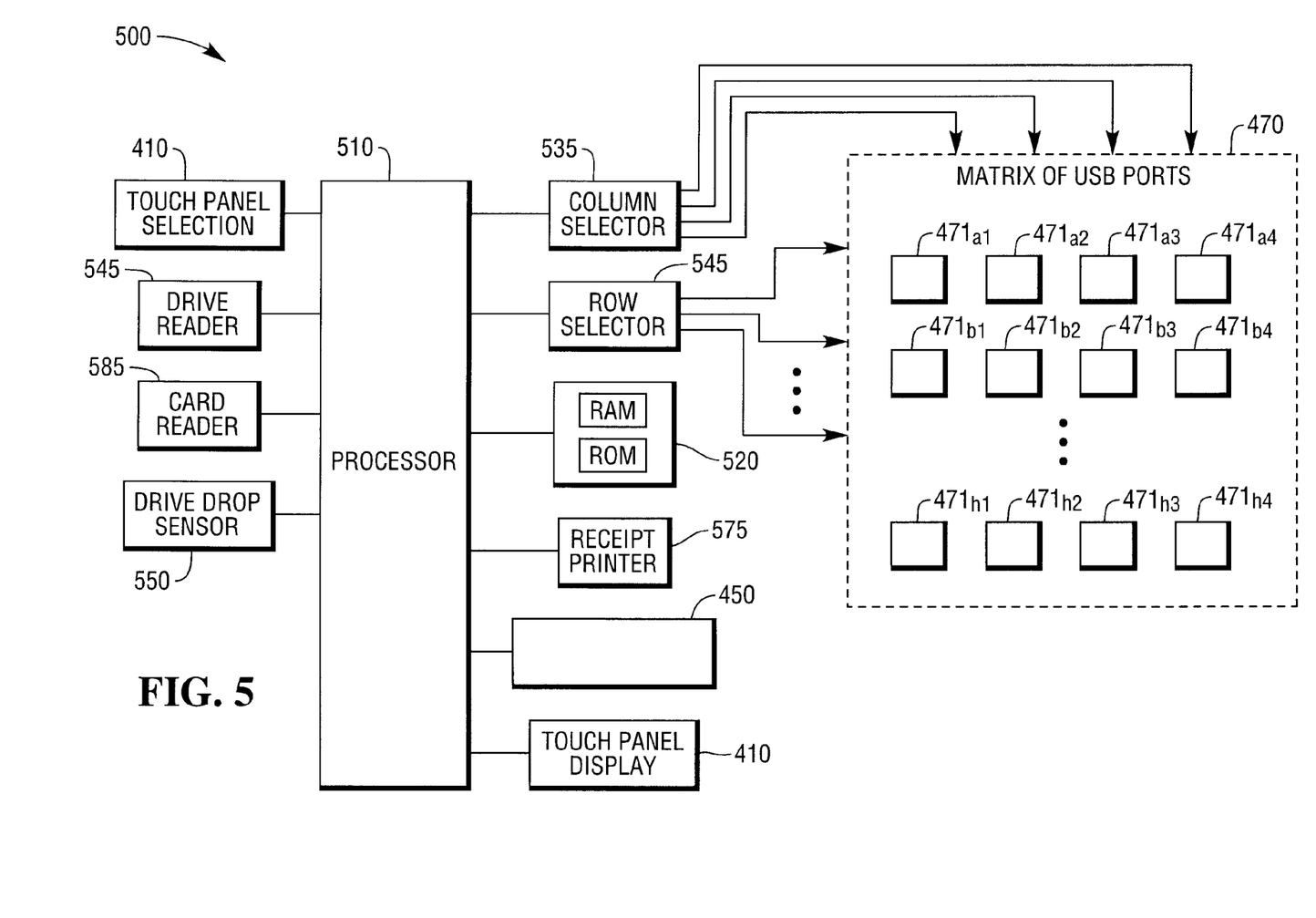
FIG. 5 illustrates aspects of an exemplary control circuit for the kiosk of FIGS. 4A and 4B.

FIG. 5 shows a control circuit 500 for controlling the digital media kiosk 400. In FIG. 5, a suitably programmed processor 510 retrieves program instructions and data from, and stores data to a memory 520 including RAM and ROM. Processor 500 receives an input signal indicative of a customer selection as a result of selection of a switch icon on a touch panel, such as touch panel 410 of FIG. 4A by a customer to select a movie. The processor 500 also drives the touch panel display 410 to provide customer instructions such as "INSERT CARD SELECT MOVIE".

When a customer inserts a credit, debit, movie rental card, or the like into slot 420 of FIG. 4A, card reader 585 reads this card and provides appropriate output to the processor 510. Upon validating the acceptability of the customer's card for payment and its acceptance, processor 510 controls picker 450 to move to the appropriate USB port of the ports $471_{a1}$-$471_{h4}$ (collectively 470) corresponding to the customer's selector. The selected media may be transported to a drop area, such as drop area 232 of FIG. 2B, and dropped. A secure USB flash drive drop sensor 550 senses that the drop has occurred and provides an output to processor 510. Once the drive drop is sensed, a record for the customer is stored in the memory 520 and a receipt printer 575 may be driven by the processor 510 to prepare a receipt.

Optionally, the processor 510 can also communicate through a communication interface with another kiosk or kiosks, a control network, or with another device such as self-checkout terminal, a checkout terminal, or the like. In the case of a rental, at the time of return of the drive by the customer, the customer inserts the drive into the return slot 435 of FIG. 4A. A drive reader 545 reads identifying indicia from the drive, provides read data to the processor 510, and the processor 510 closes out the transaction. The receipt printer 575 is driven by the processor 510 to printout a final receipt which is delivered to the customer through receipt slot 440 of FIG. 4A. In the event of a problem, for example, the customer returns a flash drive owned by the customer rather than the previously rented secure USB flash drive, the processor may print information such as "see a customer service person on site", "call a service person" at a number printed on the receipt, "email a service person" or the like.

To replenish inventory, the processor 510 of kiosk 400 advantageously can read any secure USB flash drive from the matrix 470 utilizing column selector 535 and row selector 545. Processor 510 can then overwrite any drive in the matrix or retrieve a blank drive from container 496 or 498 utilizing picker 450. This approach makes kiosk 400 particularly flexible regarding how inventory is handled and adapted to meet customer demand.

Figure 6:
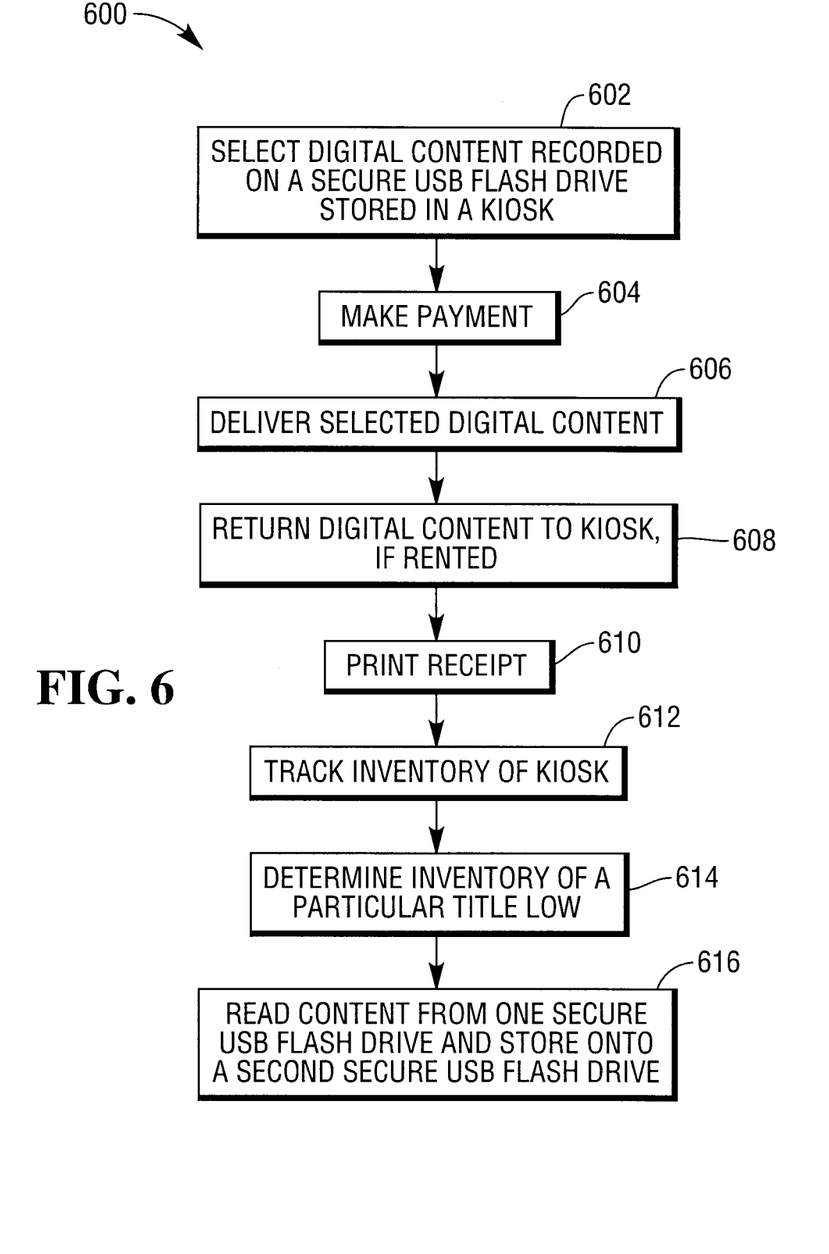
FIG. 6 illustrates a process of operating a kiosk in accordance with the present invention.

FIG. 6 shows a process 600 of kiosk operation in accordance with the present invention. In step 602, a selection of digital content recorded on a secure USB flash drive is made utilizing a kiosk, such as kiosk 200, 300 or 400, for example. In step 604, payment is made, for example, by inserting a customer card, such as a credit card into a card reader such as slot 220, 380 or 440, for example. In step 606, the selected digital content is delivered to the customer. In step 608, if the transaction was a rental, the customer returns the secure USB flash drive by inserting it into a return slot, such as return slot 235 or 435. In step 610, a receipt printer, such as printer 242 or 575, prints out a transaction receipt, and the process 600 continues by looping back up to step 602.

As the process 600 continues, a control processor, such as processor 510, preferably tracks the inventory of the kiosk, and this tracking is illustrated by inventory tracking step 612. inventory tracking. In step 614, if the processor determines that inventory of a particular title of digital content is low, content may be downloaded or a service person can be notified that inventory is needed. Alternatively and preferably, in step 616, if the processor determines that the title is already in stock, then in a kiosk like kiosk 400, for example, the processor controls the reading of content from one secure USB flash drive and its storage onto a second secure USB flash drive.

While the present invention has been disclosed in the context of various aspects of presently preferred embodiments, it will be recognized that the invention may be suitably applied to other environments consistent with the claims which follow.

We claim:

1. A kiosk employing a secure universal serial bus (USB) flash drive comprising:
   a selection mechanism for selecting a title of digital media stored on a secure USB flash drive for utilization with a standard USB port;
   a payment mechanism for making payment for the selected title;
   storage for storing secure USB flash drives for utilization with standard USB ports and storing prerecorded digital media;
   a retrieval mechanism adapted for retrieving the selected title and dispensing the selected title;
   an array of USB ports adjacent the storage and enclosed within the kiosk, wherein a control processor can read from one secure USB flash drive inserted into a first USB port of the array of ports and record to another secure USB flash drive inserted into a second USB port of the array of ports; and
   a compartment for holding a stack of blank secure USB flash drives, and wherein the retrieval mechanism can retrieve a blank secure USB flash drive from the compartment, transport the blank secure USB flash drive to said array and insert the blank secure USB flash drive into an empty USB port in said array, and wherein the retrieval mechanism comprises a vacuum picker for picking a top secure USB flash drive from a stack.

2. The kiosk of claim 1 further comprising a plurality of compartments for holding prerecorded titles of digital media recorded on secure USB flash drives in stacks open at the top.

3. The kiosk of claim 1 wherein the storage further stores standard USB flash drives storing promotional material not requiring digital rights management.

4. The kiosk of claim 1 wherein the prerecorded digital media comprises movies, music, books or computer games.

5. The kiosk of claim 4 wherein the kiosk sells or rents multiple different types of digital media recorded on secure USB flash drives.

6. The kiosk of claim 1 further operable to sell or rent digital media stored on a digital video disk.

7. The kiosk of claim 1 wherein said storage stores a supply of blank secure USB flash drives stacked one on top of another.

8. A kiosk employing a secure universal serial bus (USB) flash drive comprising:
   a selection mechanism for selecting a title of digital media stored on a secure USB flash drive for utilization with a standard USB port;
   a payment mechanism for making payment for the selected title;
   storage for storing secure USB flash drives for utilization with standard USB ports and storing prerecorded digital media;
   a retrieval mechanism adapted for retrieving the selected title and dispensing the selected title;
   an array of USB ports adjacent the storage and enclosed within the kiosk, wherein a control processor can read from one secure USB flash drive inserted into a first USB port of the array of ports and record to another secure USB flash drive inserted into a second USB port of the array of ports; and
   a compartment for holding a stack of blank secure USB flash drives wherein said retrieval mechanism transports multiple of the blank secure USB flash drives and inserts them into empty USB ports.

9. The kiosk of claim 8 wherein said multiple blank secure USB flash drives are written with digital content.

10. A kiosk employing a secure universal serial bus (USB) flash drive comprising:
    a selection mechanism for selecting a title of digital media stored on a secure USB flash drive for utilization with a standard USB port;
    a payment mechanism for making payment for the selected title;
    storage for storing secure USB flash drives for utilization with standard USB ports and storing prerecorded digital media; and
    a retrieval mechanism adapted for retrieving the selected title and dispensing the selected title; and
       an array of USB ports adjacent the storage and enclosed within the kiosk, wherein a control processor can read from one secure USB flash drive inserted into a first USB port of the array of ports and record to another secure USB flash drive inserted into a second USB port of the array of ports, wherein said retrieval mechanism transports multiple of said secure USB flash drives storing prerecorded digital media to empty USB ports where the multiple secure USB flash drives are erased and written with new content in order to reconfigure inventory.

\* \* \* \* \*